March 28, 1944.     J. W. WHITE     2,345,165

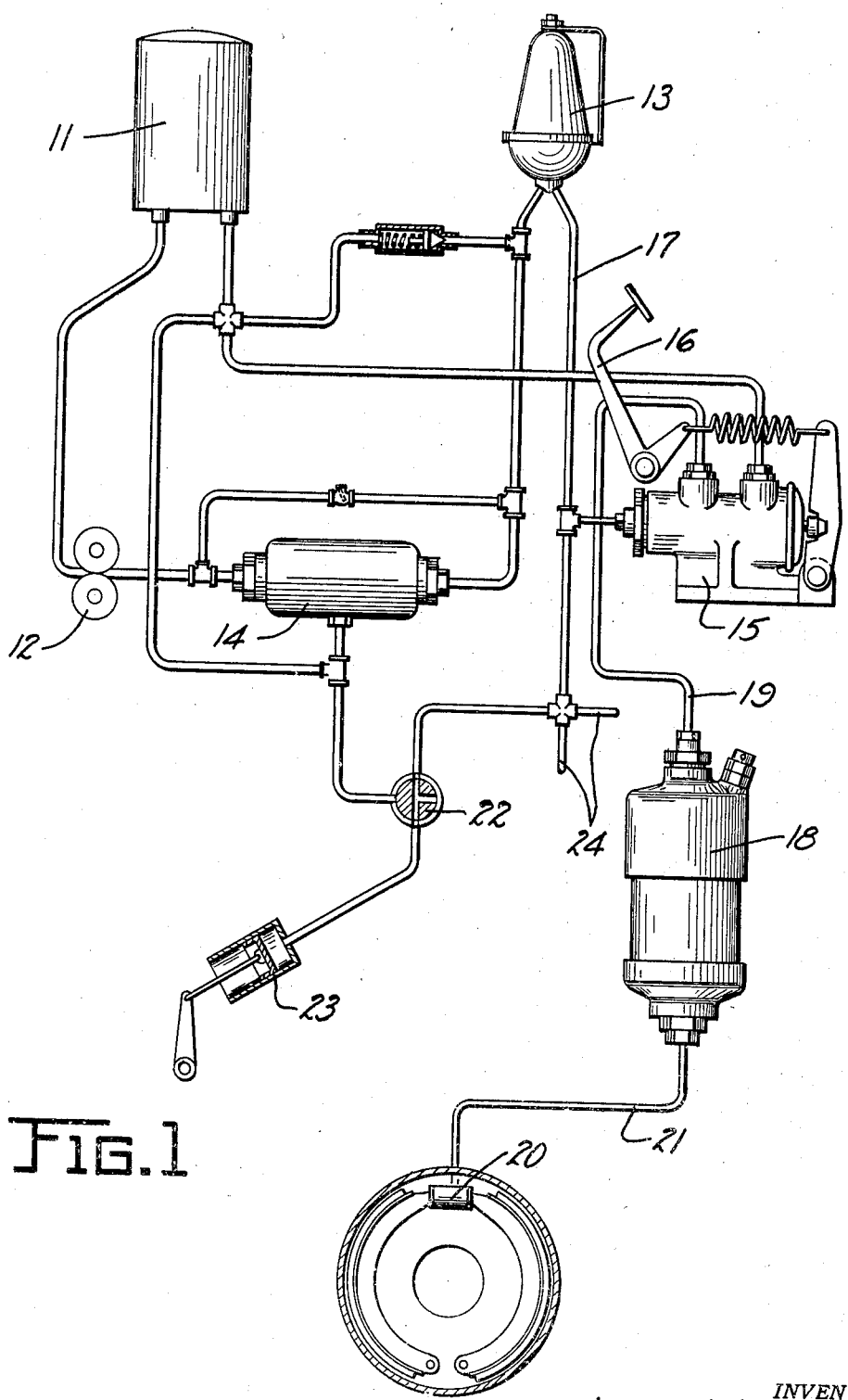

FLUID PRESSURE CYLINDER

Filed April 13, 1942     2 Sheets—Sheet 2

INVENTOR
JOHN W. WHITE
BY M. W. McConkey
ATTORNEY

Patented Mar. 28, 1944

2,345,165

UNITED STATES PATENT OFFICE 2,345,165

FLUID PRESSURE CYLINDER

John William White, Van Nuys, Calif., assignor to Bendix Aviation Corporation, South Bend, Ind., a corporation of Delaware Application April 13, 1942, Serial No. 438,722

7 Claims. (Cl. 60—54.5)

This invention relates to fluid pressure systems, and particularly to systems in which an accumulator for storing fluid under pressure may be operatively connected to a fluid actuable motor for operating the same.

It is an object of my invention to provide, in a fluid pressure system having an accumulator and a motor, a debooster between them for preventing the motor from being operated by the full pressure of the accumulator. This idea is particularly applicable to the hydraulic brake systems of airplanes when said airplanes have hydraulic accumulator systems for operating the various controls. The pressure stored in the accumulator for operating the controls referred to is often too great to allow smooth and controllable actuation of the brakes from the same accumulator as the controls unless some provision is made to limit the amount of pressure which operates the brakes.

A second object of my invention is to provide an improved debooster for connection between an accumulator and a motor, the debooster being improved in respect to its mode of compensating for changes in the volume of fluid in the part of the system directly connected to the motor, and further being improved by the provision of a reservoir and automatic means to close the reservoir against leakage whenever its normal position is inverted or otherwise disturbed. I contemplate using a debooster device having different diameter pistons connected to one another, the small diameter piston being subjected to pressure from the accumulator, and the large diameter piston being utilized to build pressure in the motor. The connection between the two pistons may be accomplished by a valve which is solidly connected to the small piston and which is adapted to close a passage through the large piston, movement of the small piston being transmitted through the valve to cause movement of the large piston once the valve has seated. On the return stroke the small piston may move with sufficient rapidity to pull the valve off its seat and allow the establishment of fluid communication between the large piston chamber and a reservoir. Alternatively, compensation for change in the volume of fluid in the large piston chamber due to contraction, expansion, or leakage may be accomplished by using a projecting rod or other positive means for lifting from its seat at the end of the piston stroke the valve which controls the compensating passage through the large piston. In this latter case the two pistons may be solidly connected and the valve may be urged to its seat by the pressure prevailing in the small piston chamber.

If a reservoir is provided as part of the debooster, it must of course be open, at least part of the time, to air at atmospheric pressure. I have provided a mechanism which will maintain the fluid in the reservoir at atmospheric pressure but which will automatically close the reservoir to prevent the escape of fluid from the reservoir owing to the force of gravity. Incidentally, I have found it desirable to position my cylindrical booster vertically with the small piston at the top and the large piston at the bottom.

Other objects and features of my invention will be apparent during the course of the following description wherein reference is had to the drawings:

Figure 1 is a diagrammatic showing of a fluid pressure accumulator system incorporating my invention;

Figures 2, 3:
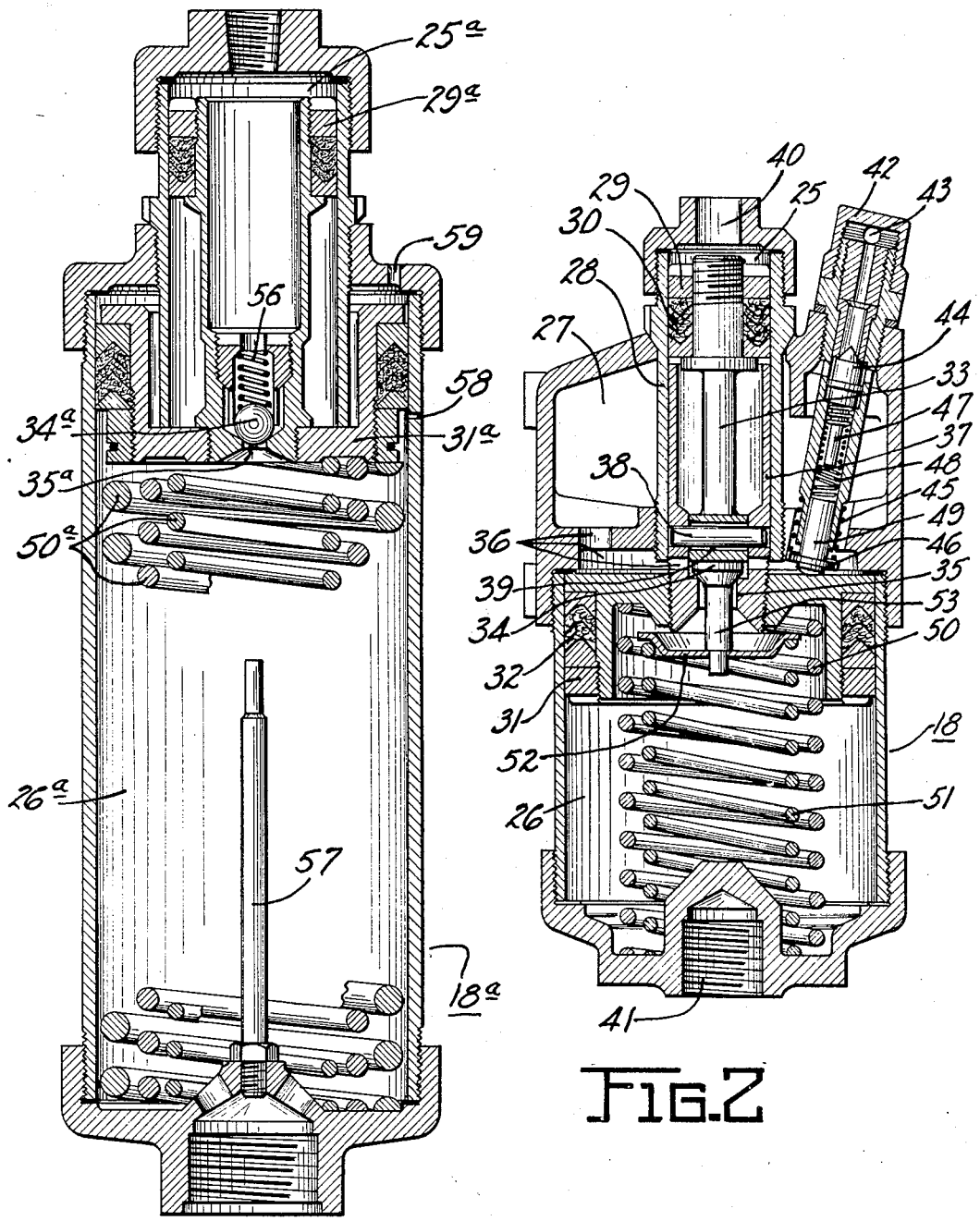
Figure 2 is a vertical section taken through the debooster unit of Figure 1.
Figure 3 is a section taken through a modified debooster unit.

The fluid pressure system of Figure 1 may conveniently be described as having a plurality of parts which operate to build up and control the amount of fluid in the accumulator, and a plurality of parts which utilize the pressure in the accumulator to operate various motors. The pressure building and controlling division of the system may comprise a reservoir 11 containing fluid at atmospheric pressure, a fluid pump 12 connected to the reservoir to draw fluid therefrom, an accumulator 13 connected to the pump for receiving fluid under pressure therefrom, and a bypass valve device 14 which indirectly controls the communication between the pump 12 and the accumulator 13. The operation of the parts thus far described in building up and controlling the pressure of the accumulator is described in detail in Burnett application Serial No. 406,671, filed August 13, 1941. Since in this application these various parts are used merely to indicate one possible means for storing fluid under pressure in an accumulator, further specific description will not be attempted.

The division of the system which utilizes the accumulator pressure for operating various motors may comprise a regulating valve 15 controlled by a lever 16 and connected by a conduit 17 to the accumulator, a debooster 18 connected by a conduit 19 to the regulating valve, a hydraulic motor 20 for operating a brake and connected to the debooster by a conduit 21, a control valve 22 connected to the accumulator and adapted to control the operation of a hydraulic motor 23, and various other hydraulic motors which may be connected to the accumulator by branch conduits 24.

The motor 23 and the several motors connected to branch conduits 24 may be used to operate the various airplane controls, such as flap controls, rudder controls, elevator controls, and wheel retracting mechanisms. The pressure in the accumulator which must be maintained in order that any of these various controls may be operated when necessary is often too high to allow the brake applying motors to be smoothly operated, i. e., there is a tendency for the fluid under pressure in the accumulator, once it is connected to the brake motors, to apply the brake with suddenness and grab. For this reason, I have provided the debooster 18 to operate the hydraulic motor 20 under less than all of the pressure maintained by the accumulator.

As stated above, the regulating valve or selector valve 15 is connected between the accumulator and the debooster. The valve 15 is adapted to be operated by manual or physical force and to control communication of fluid between the accumulator and the debooster. Operation of a valve identical with the valve 15 has been described in detail in Burnett application 406,671, referred to above, and such detailed description will not be repeated here. Suffice it to say that, at the will of the operator, fluid under pressure from the accumulator will operate the debooster 18, which in turn will operate the hydraulic motor 20. Referring to Figure 2, the debooster 18 will be observed to comprise a relatively small diameter cylindrical chamber 25 and a relatively large diameter cylindrical chamber 26, the large diameter chamber being positioned below and concentric with the small diameter chamber. A port 40 allows free communication between the small diameter chamber 25 and regulating valve conduit 19, while a port 41 allows free communication between the large diameter chamber 26 and the motor conduit 21. A reservoir 27 may be positioned above the large diameter chamber and may surround wall 28 of the small diameter chamber. A small piston 29 provided with suitable packing 30 is reciprocable in the small diameter chamber and a large piston 31 provided with suitable packing 32 is reciprocable in the large diameter chamber. A rod 33 is shown threadedly connected to the small diameter piston, the rod having at the lower end thereof a valve 34 which is adapted to seat at one end of a passage 35 that opens through the large diameter piston and thereby cuts off flow of fluid through the passage.

A plurality of passages indicated generally at 36 permit the flow of fluid from the reservoir 27 through passage 35 whenever the valve 34 is not seated. A sleeve 37, which is a part of the large diameter piston 31, may extend into the small diameter chamber below the small diameter piston. This sleeve may have a pin 38 extending from one side to the other of the sleeve and passing through a slot 39 in the rod 33, the slot being slightly larger than the pin so that a lost motion connection will be provided between the large diameter piston and the small diameter piston. Thus downward movement of small diameter piston will exert a downward force on the large diameter piston through rod 33 and valve 34 while upward movement of the small diameter piston will move valve 34 away from its seat, but movement of the small diameter piston relative to the large diameter piston will be limited by contact of the side of slot 39 with pin 38 and once contact is established the two pistons will move upward together with valve 34 open. A combined air breather fill hole cup and automatic sealing device for the reservoir have been provided in the upper end of the debooster. This device comprises a breather cap 42 having an opening 43 through which air at atmospheric pressure may be admitted to the reservoir. The flow of air through opening 43 to the reservoir is controlled by a valve 44 which is adapted to seat at times to prevent escape of fluid from the reservoir. Valve 44 normally opens as the large diameter piston moves downward. This is accomplished by a spring 45 acting on a flange 46 of a rod 49 to pull the valve 44 off its seat. The valve 44 has a rod 47 integral therewith and a spring 48 is attached to the rod 47 and to the rod 49 so that downward movement of the flange 46 places the spring 48 under tension to open valve 44. So long as the large diameter piston is in its uppermost or released position, the spring 48 will be compressed between rods 49 and 47 to close valve 44.

The pistons 29 and 31 are normally maintained in their uppermost or released positions by return springs 50 and 51, the return spring 50 being compressed between the casing of the debooster and large diameter piston 31, and the spring 51 being compressed between the casing of the debooster and a plate 52 which bears against an extension 53 of valve 34, the part 53 extending through and beyond the passage 35 in piston 31. Thus spring 50 urges piston 51 toward released position, while spring 51 acting through rods 53 and 33 urges piston 29 toward released position.

An over-all description of the operation of my device is now in order. When the operator desires to actuate the brakes, he may move lever 16 in a counterclockwise direction, with the result that fluid under pressure from the accumulator will be allowed to pass through regulating valve 15 into conduit 19 and thence into the small diameter chamber 25 of the booster 18. This fluid under pressure will move small diameter piston 29 downward causing valve 34 to seat on large diameter piston 31. As valve 34 seats it will cut off communication between the reservoir 27 and large diameter chamber 26. After valve 34 has seated further downward movement of small diameter piston 29 will cause by means of the valve downward movement of large diameter piston 31. Fluid in large diameter chamber 26 will thus be put under pressure and will be forced through port 41 and conduit 21 to the hydraulic motor 20 to operate the same in the conventional manner. Because of the difference in effective areas of pistons 29 and 31, a given unit pressure in the fluid in chamber 25 will result in considerably lower unit pressure in the fluid in chamber 26. At the same time a given displacement of fluid in chamber 25 will cause a much greater displacement of fluid in chamber 26. The motor 20 will not be applied with the full pressure maintained in the accumulator 13, and the operation of the motor 20 will be relatively controllable, since ease of controllability increases with a decrease in the operating pressure. This is true because a relatively smaller brake applying pressure will result from a given increment of effort and movement applied to the control lever 16. When lever 16 is released for the purpose of releasing the brakes, conduit 19 will be disconnected from the accumulator and will instead be connected through valve 15 to the reservoir 11. The various return springs in the system including springs 50 and 51 in the debooster will now return the various parts of the system to their original or released positions. Although springs 50 and 51 on the upward stroke return both pistons 31 and 29 as explained above, spring 51 operates directly against piston 29 and only indirectly against piston 31 through the pin 38. Thus on the return stroke of pistons 29 and 31, spring 51 will operate to open valve 34 and allow for any necessary escape of fluid from chamber 26 and make up for loss of fluid in chamber 26 whether due to expansion, contraction, or leakage.

In order that spring 51 may move small piston 29 faster than spring 50 moves large piston 31, thus holding the valve open, it is necessary that the ratios of the forces exerted by the springs to the respective resistances against return movement of the springs be so arranged that the acceleration produced by spring 51 on the return stroke will be greater than the acceleration produced by spring 50. This will be accomplished after two springs are approximately equal in strength and the mass of the larger piston is, as shown, greater than the mass of the smaller piston and its connected parts. The result could also be accompilshed by eliminating spring 50, in which case force will be transmitted from the spring 51 through the pin and slot connection to the large piston in such manner that the valve will be open on the up stroke. Various factors enter into the total resistances offered to the respective springs, such as friction and fluid pressure. It will be further evident that vibration, rough weather, banking of the plane, or inverted flight might allow fluid to escape from the reservoir except for the operation of valve 44. As long as low pressure piston 31 remains in its upward or released position it will contact rod 49 compressing spring 48 and closing valve 44 to prevent escape of fluid from the reservoir.

Figure 3 shows a booster labelled 18a, having a design somewhat different from the booster 18 of Figure 2. The modified booster 18a has a small diameter piston 29a and a large diameter piston 31a, and in this respect is comparable to the booster of Figure 2. However the modified booster has a different compensating valve comprising ball valve member 34a urged by spring 56 to seat against piston 31a and to close a passage 35a. Fluid under pressure from the accumulator may enter small diameter high pressure chamber 25a to urge pistons 29a and 31a downward, putting fluid in large diameter low pressure chamber 26a under pressure to apply the hydraulic motor. Pressure of the fluid in chamber 25a assists spring 56 in holding valve 34a closed, and the valve remains closed until the end of the piston stroke at which time it will be contacted by the end of a rod 57 projecting upward from the bottom of the debooster casing. It will be noted that pistons 29a and 31a have a threaded connection with one another so that they are solidly connected and move as a unit in both directions. A plurality of return springs 50a urge piston 31a toward its released position. Modified debooster 18a does not have a reservoir directly associated therewith, compensation for changes in the volume of fluid in the hydraulic motor and in chamber 26a being made by connecting chamber 26a to chamber 25a which in turn may be connected to a fluid reservoir. The chamber 25a is connected with the reservoir 11, through conduit 19, valve 15, and the conduit between valve 15 and reservoir 11, when said valve is so positioned that no pressure is transmitted to the debooster from the accumulator. A small escape hole 58 may be provided in the wall of the low pressure chamber 26a to take care of liquid expansion, liquid being allowed to escape through hole 58 to the ground. Also an escape hole 59 may be provided to allow the escape of liquid which leaks past the packing of the high pressure piston 29a. Outside of the differences just noted between modified debooster 18a and the debooster 18 of Figure 2, the two units are alike in structure and operation. It is therefore not believed necessary to specifically describe the operation of the modified debooster.

Although certain specific embodiments of my invention have been described herein it is not my intention to limit the invention to the embodiments described, but only to limit it by the terms of the appended claims.

I claim:

1. For use in a fluid pressure system having an accumulator for storing fluid under pressure and a fluid pressure operated motor, a debooster connected between the accumulator and the motor comprising a casing forming a high pressure chamber, a low pressure chamber, and a reservoir open at times to atmosphere, connected pistons reciprocable in the respective chambers, and means for cutting off the reservoir from the atmosphere whenever the pistons are in their released positions.

2. For use in a fluid pressure system having an accumulator for storing fluid under pressure and a fluid pressure operated motor, a debooster connected between the accumulator and the motor comprising a casing forming a small diameter high pressure chamber, a large diameter low pressure chamber, and a reservoir open at times to atmosphere, connected differential diameter pistons reciprocable in the respective chambers, and means for cutting off the reservoir from the atmosphere whenever the pistons are in their released positions.

3. In a fluid pressure system having an accumulator for storing fluid under pressure and a fluid pressure operated motor, a debooster connected between the accumulator and the motor comprising a casing forming a high pressure chamber, a low pressure chamber, and a reservoir open at times to atmosphere, connected pistons reciprocable in their respective chambers, and means controlled by at least one of said pistons for cutting off the reservoir from atmosphere whenever the pistons are in their released position.

4. In a fluid pressure system having an accumulator for storing fluid under pressure and a fluid pressure operated motor, a debooster connected between the accumulator and the motor and comprising a casing forming a high pressure chamber, a low pressure chamber, and a reservoir having a vent to atmosphere, connected pistons reciprocable in the respective chambers, and a valve controlling the vent, said valve being controlled by one of said pistons and closed thereby when the pistons are in their released position.

5. The invention defined by claim 4 wherein there is resilient means between the valve and the piston controlling same.

6. In a fluid pressure system having an accumulator for storing fluid under pressure and a fluid pressure operated motor, a debooster connected between the accumulator and the motor, comprising a casing having a small diameter high pressure chamber, a large diameter low pressure chamber, and a reservoir opened at times to atmosphere, connected differential diameter pistons reciprocable in the respective chambers, and resiliently controlled means for cutting off the reservoir from atmosphere when the pistons are in their released position.

7. In a fluid pressure transmitting device adapted to effect a change in the effective pressure transmitted thereby, small and large diameter chambers, interconnected pistons reciprocable in the respective chambers, a fluid reservoir having a vent to atmosphere, and means operated by the pistons adapted to control said vent.

JOHN WILLIAM WHITE.